(12) United States Patent
Hwang et al.

(10) Patent No.: US 12,546,926 B2
(45) Date of Patent: Feb. 10, 2026

(54) HOLOGRAPHIC OPTICAL ELEMENT, MANUFACTURING METHOD THEREFOR AND MANUFACTURING DEVICE THEREFOR

(71) Applicant: LG Chem, Ltd., Seoul (KR)

(72) Inventors: Hye Won Hwang, Daejeon (KR); Jae Jin Kim, Daejeon (KR); Bo Ra Jung, Daejeon (KR); Do Kyeong Kwon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 345 days.

(21) Appl. No.: 18/022,605

(22) PCT Filed: Aug. 23, 2021

(86) PCT No.: PCT/KR2021/011204
§ 371 (c)(1),
(2) Date: Feb. 22, 2023

(87) PCT Pub. No.: WO2022/045699
PCT Pub. Date: Mar. 3, 2022

(65) Prior Publication Data
US 2023/0314686 A1    Oct. 5, 2023

(30) Foreign Application Priority Data
Aug. 25, 2020  (KR) .................. 10-2020-0107287

(51) Int. Cl.
*G03H 1/04*   (2006.01)
*G02B 5/32*   (2006.01)
*G02B 27/01*  (2006.01)

(52) U.S. Cl.
CPC ............ *G02B 5/32* (2013.01); *G03H 1/0402* (2013.01); *G02B 27/0103* (2013.01);
(Continued)

(58) Field of Classification Search
CPC .................. G02B 5/32; G02B 27/0103; G02B 2027/0109; G02B 27/01; G02B 27/0101;
(Continued)

(56) References Cited

U.S. PATENT DOCUMENTS

2004/0100671 A1    5/2004  Kumagai
2006/0291021 A1   12/2006  Mukawa
(Continued)

FOREIGN PATENT DOCUMENTS

CN    1892271 A    1/2007
CN    1940610 A    4/2007
(Continued)

OTHER PUBLICATIONS

Extended European Search Report including Written Opinion for Application No. 21861996.3 dated Dec. 22, 2023, pp. 1-11.
(Continued)

*Primary Examiner* — Arnel C Lavarias
(74) *Attorney, Agent, or Firm* — Lerner David LLP

(57) ABSTRACT

A holographic optical element, a method for manufacturing the same and an apparatus for producing the same are provided. More particularly, the holographic optical element is capable of enhancing the brightness of an augmented image. In one example, the holographic optical element includes a plurality of optical elements combined together and has interference patterns recorded on the plurality of optical elements, respectively. The interference patterns have the same pitch and different inclination angles.

11 Claims, 7 Drawing Sheets

(52) U.S. Cl.
CPC ........... *G02B 2027/0109* (2013.01); *G03H 2001/0439* (2013.01); *G03H 2001/0441* (2013.01)

(58) Field of Classification Search
CPC .... G02B 2027/0105; G02B 2027/0118; G02B 27/017; G02B 27/0172; G02B 2027/0174; G02B 2027/0192; G02B 2027/0194
USPC ..... 359/15, 1, 12, 13, 22, 25, 32, 35; 430/1, 430/2
See application file for complete search history.

(56) References Cited

U.S. PATENT DOCUMENTS

| | | | |
|---|---|---|---|
| 2007/0053029 | A1 | 3/2007 | Raguin et al. |
| 2007/0070504 | A1 | 3/2007 | Akutsu et al. |
| 2007/0216981 | A1 | 9/2007 | Matsumura et al. |
| 2010/0142015 | A1 | 6/2010 | Kuwahara et al. |
| 2010/0165426 | A1 | 7/2010 | Kihara et al. |
| 2017/0176745 | A1 | 6/2017 | Poon et al. |
| 2019/0035635 | A1 | 1/2019 | Kim et al. |
| 2019/0154439 | A1 | 5/2019 | Binder |
| 2019/0212699 | A1 | 7/2019 | Waldern et al. |
| 2019/0250563 | A1 | 8/2019 | Tsen |
| 2019/0339646 | A1 | 11/2019 | Kim et al. |

FOREIGN PATENT DOCUMENTS

| | | | | |
|---|---|---|---|---|
| CN | 101900852 | A | 12/2010 | |
| CN | 106406061 | A | 2/2017 | |
| CN | 107632406 | A | 1/2018 | |
| EP | 3540521 | A1 | 9/2019 | |
| JP | H11202742 | A | 7/1999 | |
| JP | 2001176119 | A * | 6/2001 | .......... G11B 7/0903 |
| JP | 2006350129 | A | 12/2006 | |
| JP | 3931208 | B2 | 6/2007 | |
| JP | 4180355 | B2 | 11/2008 | |
| JP | 2008287107 | A | 11/2008 | |
| JP | 2010139524 | A | 6/2010 | |
| JP | 4850097 | B2 | 1/2012 | |
| KR | 100590519 | B1 | 6/2006 | |
| KR | 20070001107 | A | 1/2007 | |
| KR | 101525853 | B1 | 6/2015 | |
| KR | 20180062385 | A | 6/2018 | |
| KR | 20190012563 | A | 2/2019 | |
| KR | 20190037791 | A | 4/2019 | |
| KR | 20190135782 | A | 12/2019 | |
| WO | 2019243554 | A1 | 12/2019 | |

OTHER PUBLICATIONS

Extended European Search Report including Written Opinion for Application No. 21861996.3 dated Aug. 11, 2023, pp. 1-11.
International Search Report for PCT/KR2021/011204 mailed Dec. 14, 2021. 4 pgs.
Search Report dated Jul. 17, 2025 from the Office Action for Chinese Application No. 202180018234.7 issued Jul. 19, 2025. 2 pgs.

* cited by examiner

[Fig. 1]
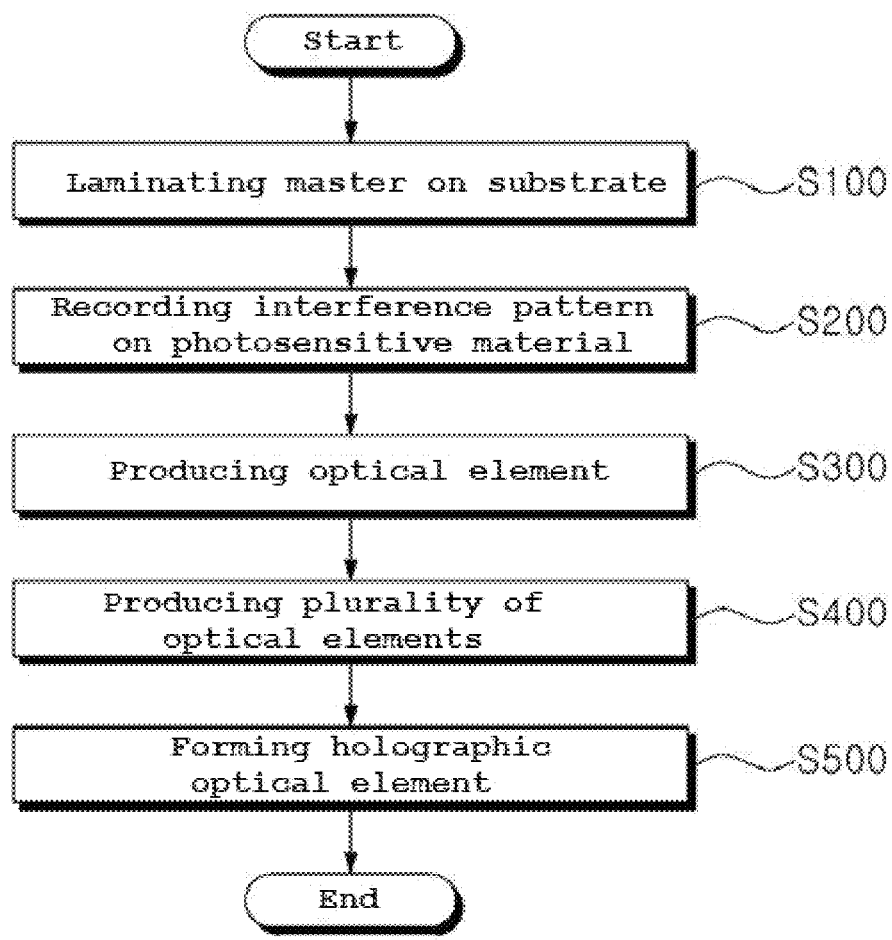

[Fig. 2]
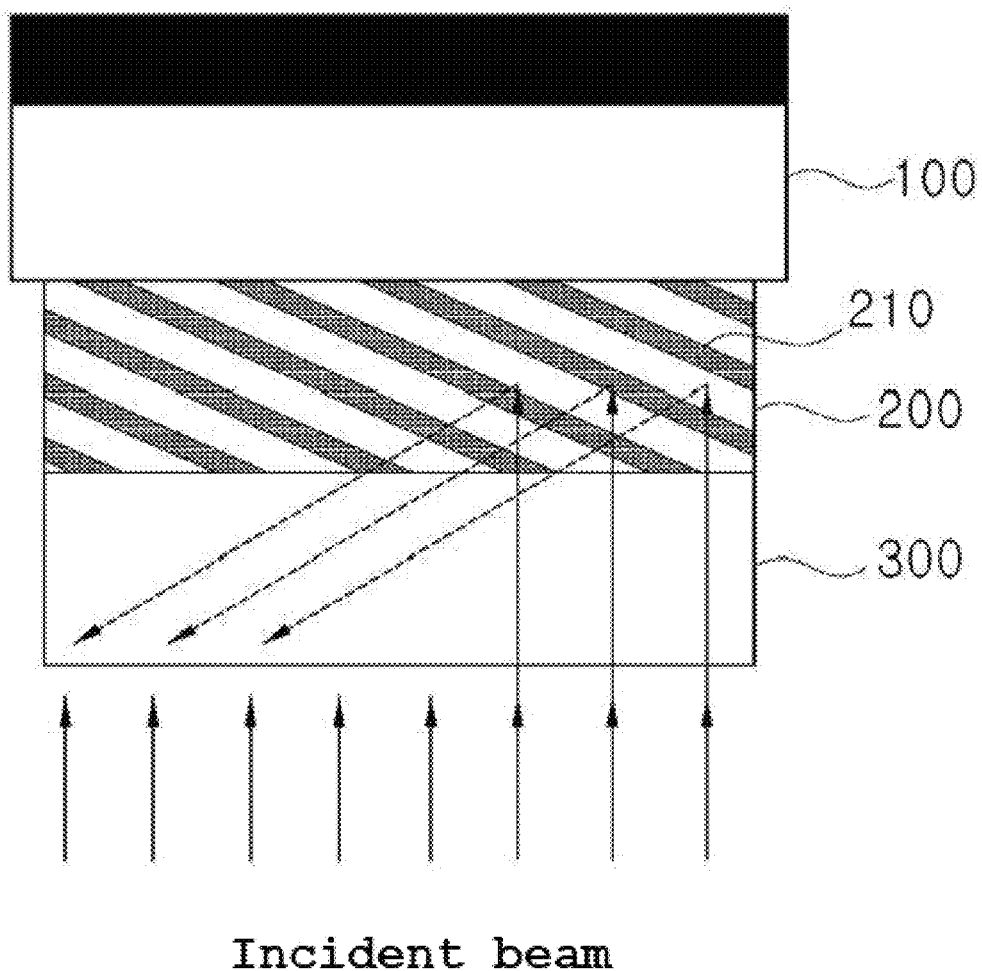
Incident beam

[Fig. 3]
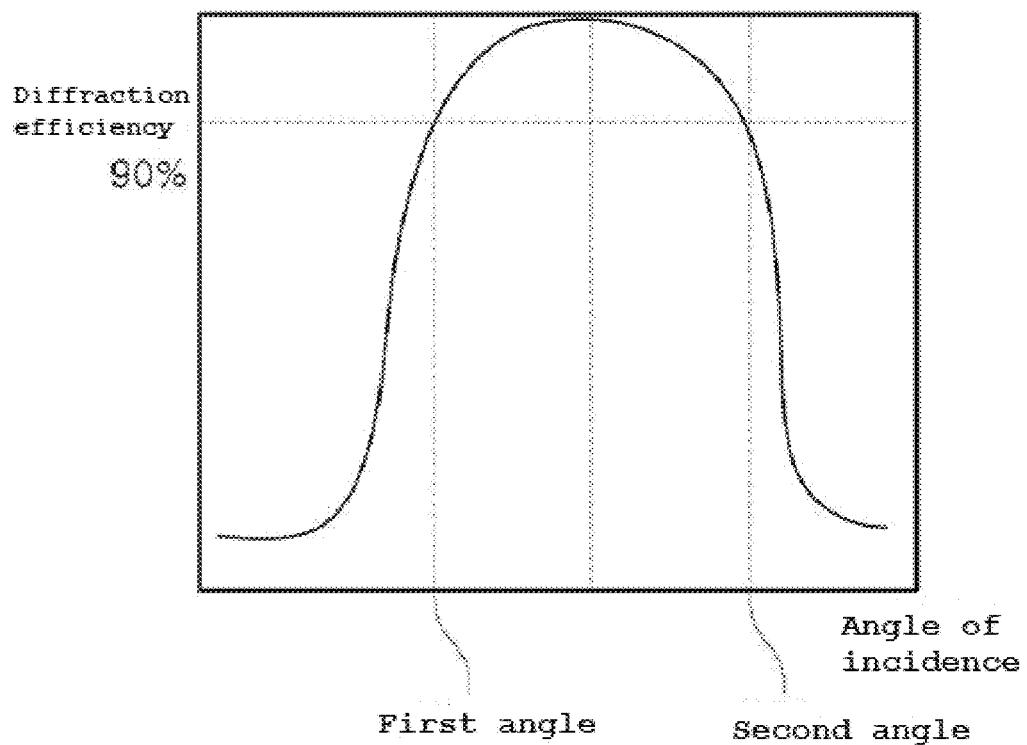

[Fig.4A]
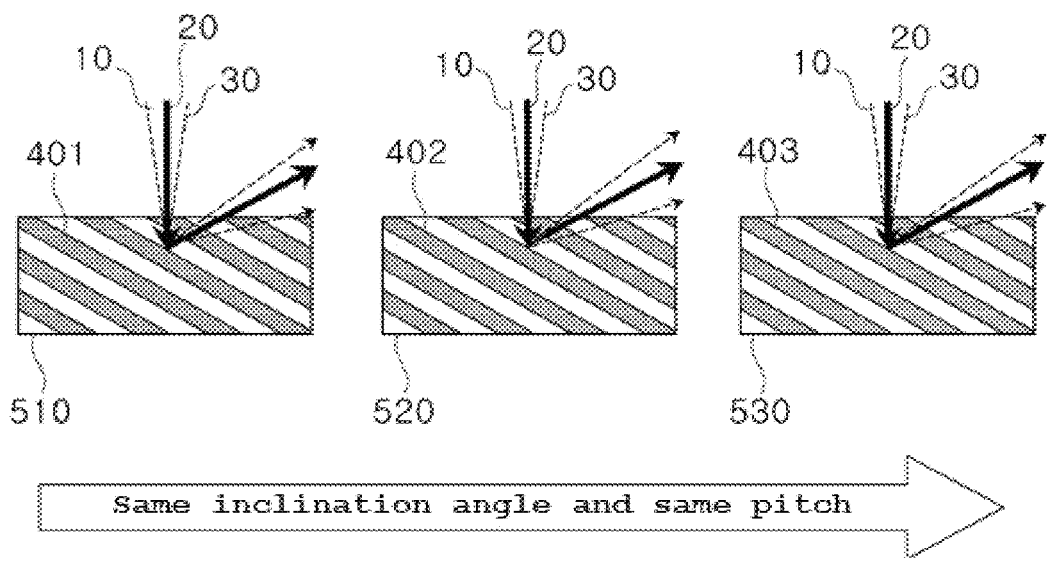
[Fig. 4B]
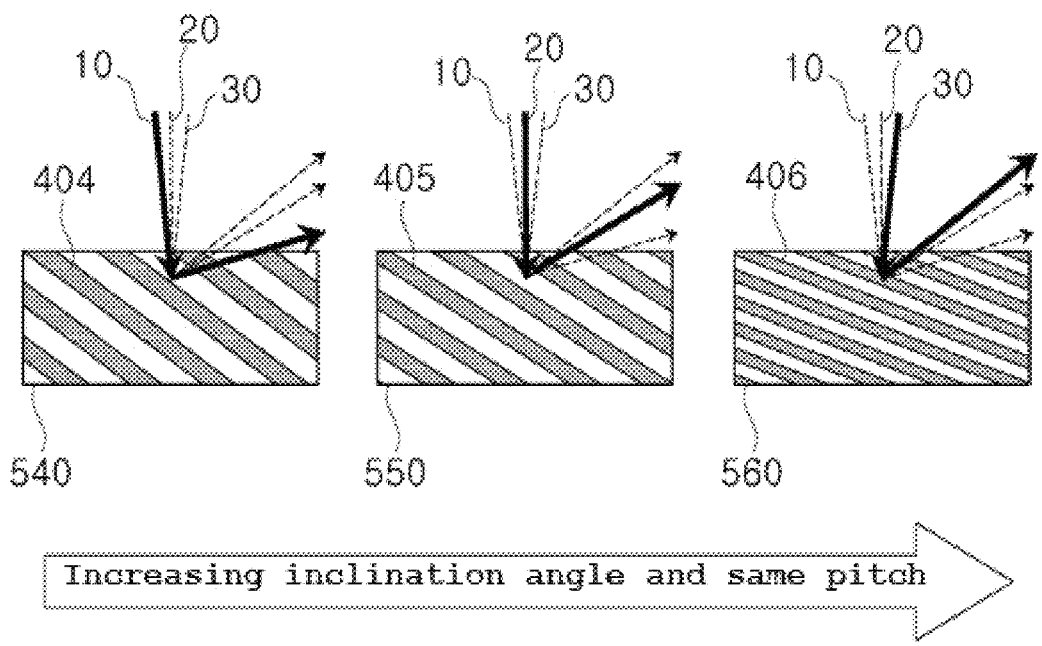

[Fig. 5A]
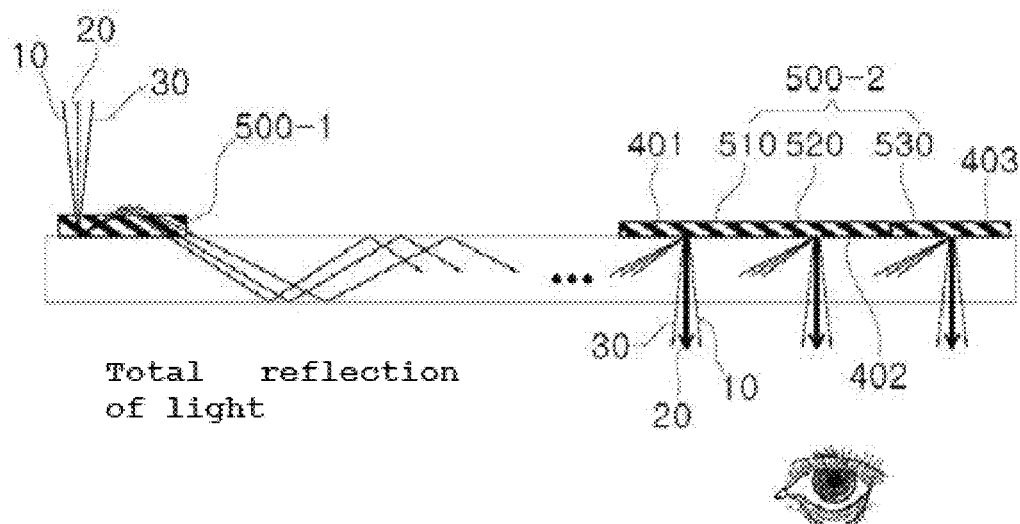
[Fig. 5B]
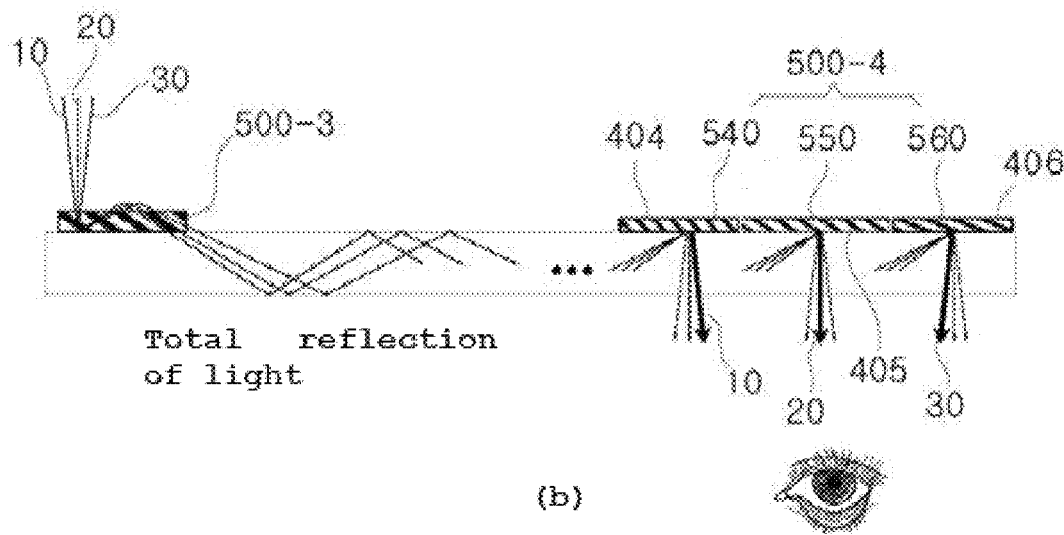

[Fig. 6A]
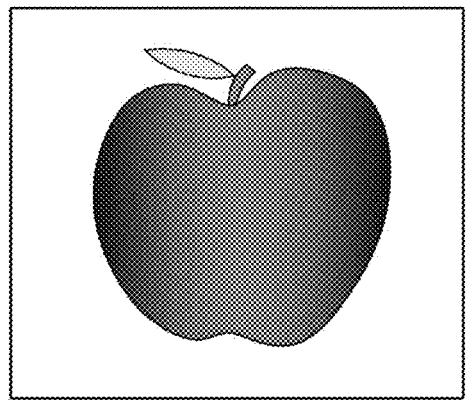
[Fig. 6B]
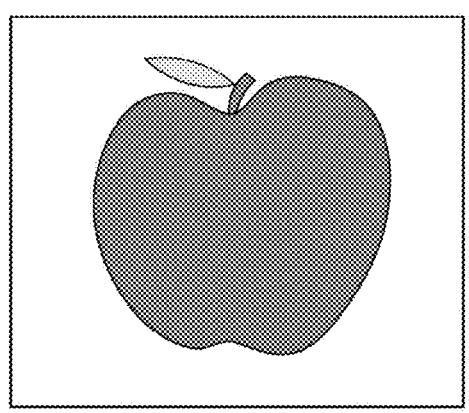

[Fig. 7]
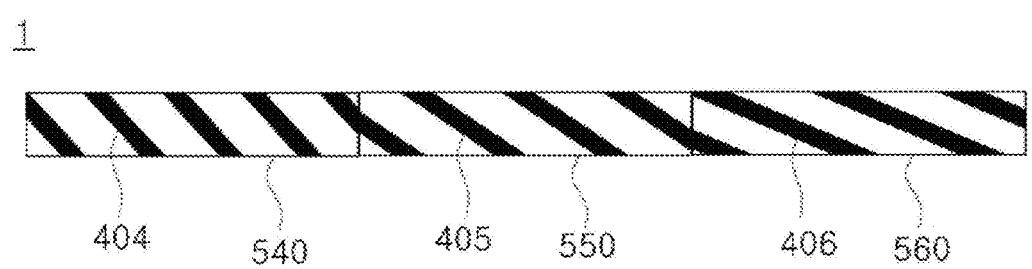

HOLOGRAPHIC OPTICAL ELEMENT, MANUFACTURING METHOD THEREFOR AND MANUFACTURING DEVICE THEREFOR

CROSS-REFERENCE TO RELATED APPLICATIONS

This application is a national phase entry under 35 U.S.C. § 371 of International Application No. PCT/KR2021/011204, filed on Aug. 23, 2021, which claims priority from Korean Patent Application No. 10-2020-0107287 filed on Aug. 25, 2020, the entire contents of which are incorporated by reference herein.

BACKGROUND

Technical Field

The present disclosure relates to a holographic optical element, a method for producing the same, and an apparatus for producing the same, and more particularly, to a holographic optical element capable of enhancing the brightness of an augmented image, a method for producing the same, and an apparatus for producing the same.

Related Art

A holographic optical element is an optical element produced by recording an interference pattern on a photosensitive material through interference between an object wave, which is light reflected and diffracted from an object, and a reference wave which is another wave coherent with the light. Since the photosensitive material having the interference pattern recorded thereon reproduces augmented image information using diffraction instead of reflection or refraction, this photosensitive material is also classified as a type of diffractive optical element.

Meanwhile, the holographic optical element is generally produced by irradiating the photosensitive material with the object wave and the reference wave as described above.

The holographic optical element produced in this way may be applied to a vehicle head-up display (HUD), etc., and may provide augmented image light, which is necessary for driving, to a user's eye box area so that a user such as a driver who wants to visually recognize an augmented image (hereinafter referred to as the user) can see information necessary for driving along with the surrounding environment.

As such, in order for the user to effectively view the augmented image provided to the head-up display (HUD) even in bright daytime, the brightness of the augmented image is important.

However, in the case of a holographic optical element that is used in a conventional head-up display (HUD), interference patterns in which maximum diffraction efficiency angles are constant are formed so that light with high brightness is emitted only in a certain direction. Hence, the holographic optical element has a problem in that most of the light with high brightness is emitted to areas other than the user's eye box area, and thus the brightness of the augmented image is lowered.

In addition, among the light emitted to the user's eye box area by the holographic optical element used in the conventional head-up display (HUD), only the light containing information on a specific part of the augmented image has high brightness. Thus, the holographic optical element has a problem in that the augmented image viewed by the user has different brightness for each part.

SUMMARY

An object of the present disclosure is to solve the problem that augmented image light emitted from a holographic optical element used in a head-up display (HUD) or the like is not effectively focused on a user's eye box area.

Another object of the present disclosure is to solve the problem that an augmented image provided to the user's eye box area from a holographic optical element used in a head-up display (HUD) or the like does not have uniform brightness throughout thereof.

Still another object of the present disclosure is to solve the problem that it is not easy to produce a holographic optical element which is capable of emitting augmented image light so that an augmented image provided to the user's eye box area has uniform and high brightness.

Objects of the present disclosure are not limited to the above-described objects, and other object not mentioned will be clearly understood by those skilled in the art from the following description.

One embodiment of the present disclosure provides a method for producing a holographic optical element, the method including steps of: (1) laminating on a substrate a master which is a diffractive optical element having an interference pattern formed thereon; (2) laminating a photosensitive material on the master, and recording the interference pattern of the master on the photosensitive material by irradiating the photosensitive material with an incident beam at a predetermined angle of incidence; (3) producing an optical element by separating the photosensitive material having the interference pattern recorded thereon from the master; (4) producing a plurality of optical elements by repeating steps (2) and (3) a predetermined number of times: and (5) forming a holographic optical element by combining the plurality of optical elements, wherein step (4) includes irradiating the photosensitive material with an incident beam at a different angle of incidence in each repeated step (2) so that the interference patterns recorded on the plurality of optical elements, respectively, have the same pitch and different inclination angles.

According to one embodiment of the present disclosure, step (4) may include irradiating the photosensitive material with the incident beam after rotating the substrate by a predetermined angle in each step (2).

According to one embodiment of the present disclosure, step (5) may include combining the plurality of optical elements so that the inclination angles of the interference patterns recorded on the holographic optical element gradually increase or decrease in a predetermined direction.

According to one embodiment of the present disclosure, the master may diffract the incident beam to the photosensitive material when the angle of incidence of the incident beam is between a first angle and a second angle, and the photosensitive material may be irradiated with the incident beam after the substrate is rotated so that the angle of incidence of the incident beam incident to the master is between the first angle and the second angle.

According to one embodiment of the present disclosure, the master may be composed of a holographic optical element or a diffractive optical element having a surface relief grating formed thereon.

According to one embodiment of the present disclosure, the photosensitive material may be a photopolymer.

Another embodiment of the present disclosure provides a holographic optical element which is composed of a plurality of optical elements combined together and in which interference patterns recorded on the optical elements, respectively, have the same pitch and different inclination angles.

According to one embodiment of the present disclosure, the plurality of optical elements may be combined together so that the inclination angles of the interference patterns gradually increase or decrease in a predetermined direction.

Still another embodiment of the present disclosure provides an apparatus for producing a holographic optical element, the apparatus including: a lamination unit configured to form a laminate by laminating a substrate, a master, which is a diffractive optical element having an interference pattern formed thereon, and a photosensitive material in a predetermined order; a beam irradiation unit configured to irradiate the photosensitive material with an incident beam at a predetermined angle of incidence so that the interference pattern of the master is recorded on the photosensitive material; a rotation control unit configured to rotate at least one of the laminate and the beam irradiation unit so that the angle of incidence of the incident beam incident to the photosensitive material is controlled; a master removal unit configured to produce an optical element by separating the photosensitive material, on which the interference pattern is recorded, from the master; and a combining unit configured to combine a plurality of the optical elements to form a holographic optical element.

According to one embodiment of the present disclosure, the rotation control unit may rotate at least one of the laminate and the beam irradiation unit in order to irradiate the photosensitive material with the incident beam at a different angle of incidence so that the interference patterns recorded on the plurality of optical elements, respectively, have the same pitch and different inclination angles.

According to one embodiment of the present disclosure, the combining unit may combine the plurality of optical elements together so that the inclination angles of the interference patterns recorded on the holographic optical element gradually increase or decrease in a predetermined direction.

Specific details of other embodiments for achieving the objects are included in the following description of the present disclosure and the accompanying drawings.

BRIEF DESCRIPTION OF THE DRAWINGS

FIG. 1 is a flowchart illustrating a method for producing a holographic optical element according to one embodiment of the present disclosure.

FIG. 2 is a view illustrating a process of recording an interference pattern on a photosensitive material.

FIG. 3 is a graph showing the diffraction efficiency of an incident beam incident to a master as a function of the angle of incidence of the incident beam.

FIG. 4A is a view showing angles at which incident beams are diffracted with maximum efficiency in a plurality of optical elements including interference patterns having the same inclination angle.

FIG. 4B is a view showing angles at which incident beams are diffracted with maximum efficiency in a plurality of optical elements including interference patterns having different inclination angles.

FIG. 5A is a view showing the augmented image light emitted to the user's eye box by a conventional holographic optical element obtained by combining the plurality of optical elements shown in FIG. 4A.

FIG. 5B is a view showing the augmented image light emitted to the user's eye box by a holographic optical element according to one embodiment of the present disclosure, obtained by combining the plurality of optical elements shown in FIG. 4B.

FIG. 6A is a view showing an example of an augmented image according to FIG. 5A, which is visible to the user.

FIG. 6B is a view showing an example of an augmented image according to FIG. 5B, which is visible to the user.

FIG. 7 is a view showing a holographic optical element according to one embodiment of the present disclosure.

DETAILED DESCRIPTION

Hereinafter, preferred embodiments of the present disclosure will be described in detail with reference to the accompanying drawings and the following description. However, the present disclosure is not limited to the embodiments described herein and may be embodied in other forms. Throughout the present specification, like reference numerals refer to like components.

Hereinafter, a method for producing a holographic optical element 1 according to one embodiment of the present disclosure will be described.

FIG. 1 is a flowchart illustrating a method for producing a holographic optical element according to one embodiment of the present disclosure.

Referring to FIGS. 1 and 2, the method for producing the holographic optical element 1 according to one embodiment of the present disclosure may include: step (1) (S100) of laminating a master 200 on a substrate 100; step (2) (S200) of recording an interference pattern on a photosensitive material; step (3) (S300) of producing an optical element; step (4) (S400) of producing a plurality of optical elements; and step (5) (S500) of forming a holographic optical element.

First, step (1) (S100) will be described.

Step 1 (S100) is a step of laminating the master 200 on the substrate 100 made of glass or the like. In this case, the master 200 may be composed of a conventional holographic optical element (HOE) or a diffractive optical element (DOE) having a surface relief grating formed thereon.

On the master 200, there may be formed a master interference pattern 210 to be transferred and recorded on the holographic optical element to be produced.

Now, step (2) (S200) will be described.

Step 2 (S200) is a step of recording an interference pattern 404, 405 or 406 (see FIG. 4B or 7) on a photosensitive material 300.

The photosensitive material 300 is a material on which optical information may be recorded by exposure to light, and a conventional photosensitive material known in the field of holograms may be used. For example, the photosensitive material 300 may include a photopolymer on which optical information may be recorded due to a difference in refractive index between an exposed portion and a non-exposed portion thereof.

FIG. 2 is a view illustrating a process of recording an interference pattern on a photosensitive material.

Referring to FIG. 2, when the photosensitive material 300 is laminated on the master 200 laminated on the substrate 100 and is irradiated with an incident beam such as a laser beam, the light incident to the master 200 through the photosensitive material 300 may be diffracted to the photosensitive material 300. At this time, an interference pattern 404, 405 or 406 (see FIG. 4B or 7) may be recorded on the photosensitive material 300 by the light diffracted from the master 200 to the photosensitive material 300.

Now, step (3) (S300) will be described.

Step (3) (S300) is a step of producing an optical element 540, 550 or 560 (see FIG. 4B or 7) by separating the photosensitive material 300 from the master 200. The photosensitive material 300 having the interference pattern 404, 405 or 406 recorded thereon and separated from the master 200 may be referred to as the optical element 540, 550 or 560.

Now, step (4) (S400) will be described.

Step (4) (S400) is a step of producing a plurality of optical elements 540, 550 and 560 by repeating step (2) (S200) and step (3) (S300) a predetermined number of times. The number of the plurality of optical elements 540, 550 and 560 having the master interference pattern 210 transferred thereto may be the same as the number of times of repeating step (2) (S200) and step (3) (S300). In addition, in step (4) (S400), the plurality of optical elements 540, 550 and 560 may be produced so that the interference patterns 404, 405 and 406 recorded on the optical elements 540, 550 and 560 have the same pitch but have different inclination angles.

For example, the plurality of optical elements 540, 550 and 560 on which the interference patterns 404, 405 and 406 having the same pitch and different inclination angles are formed may be produced by irradiating each photosensitive material 300 laminated on the master 200 with an incident beam at a different angle of incidence.

Specifically, the master 200 and the photosensitive material may be irradiated with an incident beam at a different angle of incidence by rotating the substrate 100, on which the master 200 and the photosensitive material 300 are laminated, by a predetermined angle.

First, when a first photosensitive material is irradiated with an incident beam in a direction perpendicular to the plane of each of the master 200 and the first photosensitive material, a first interference pattern 404 having an inclination angle of θa may be recorded on the first photosensitive material.

In addition, when the substrate 100 on which the master 200 and a second photosensitive material are laminated is rotated clockwise by an angle of θ1 and then the second photosensitive material is irradiated with an incident beam, a second interference pattern 405 having an inclination angle of θb may be recorded on the second photosensitive material.

In addition, when the substrate 100 on which the master 200 and a third photosensitive material are laminated is rotated counterclockwise by an angle of θ2 and then the third photosensitive material is irradiated with an incident beam, a third interference pattern 406 having an inclination angle of θc may be recorded on the third photosensitive material.

In this case, the inclination angle θb of the second interference pattern 405 recorded on the second photosensitive material is greater than the inclination angle θa of the first interference pattern 404 recorded on the first photosensitive material, and the inclination angle θc of the third interference pattern 406 recorded on the third photosensitive material is smaller than the inclination angle θa of the first interference pattern 404 recorded on the first photosensitive material.

Meanwhile, the diffraction efficiency of the incident beam incident to the master 200 may vary depending on the angle of incidence of the incident beam.

FIG. 3 is a graph showing the diffraction efficiency of an incident beam incident to the master as a function of the angle of incidence of the incident beam.

Referring to FIG. 3, for example, when the angle of incidence of the incident beam incident to the master 200 is between a first angle and a second angle, the master 200 may diffract the incident beam by 90 percent or more.

In order to effectively record the interference pattern 404, 405 or 406 on the photosensitive material 300, the incident beam incident to the master 200 needs to be incident at an angle of incidence at which it is diffracted with high efficiency.

The rotation angle of the substrate 100 is the same as the angle of incidence of the incident beam incident to the master 200. Thus, when the photosensitive material 300 is irradiated with the incident beam after rotation of the substrate 100 in step (4) (S400), the substrate 100 is preferably rotated so that the rotation angle of the substrate 100 has a value within the range of the angle of incidence of the incident beam incident to the master 200, at which the incident beam is diffracted with high efficiency.

Now, step (5) (S500) will be described.

Step (5) (S500) is a step of forming the holographic optical element 1 by combining the plurality of optical elements 540, 550 and 560 produced in step (4) (S400).

When the holographic optical element 1 is formed by combining the plurality of optical elements 540, 550 and 560, the plurality of optical elements 540, 550 and 560 may be combined with one another so that the inclination angles of the interference patterns recorded on the holographic optical element 1 gradually increase or decrease in a predetermined direction.

As the inclination angles of the interference patterns recorded on the holographic optical element 1 are configured to gradually increase or decrease in a predetermined direction as described above, the angle of incidence of an incident beam, at which the incident beam may be diffracted with maximum efficiency (hereinafter referred to as the "maximum diffraction efficiency angle") may vary depending on positions of the holographic optical element 1.

FIG. 4A is a view showing the maximum diffraction efficiency angles in a plurality of optical elements including interference patterns having the same inclination angle.

Referring to FIG. 4A, for example, when interference patterns 401, 402 and 403 formed respectively on a first optical element 510, a second optical element 520 and a third optical element 530 for producing the holographic optical element 1 have the same pitch and the same inclination angle, the first optical element 510, the second optical element 520 and the third optical element 530 have the same maximum diffraction efficiency angle.

Specifically, when the first optical element 510 is irradiated with a first incident beam 10 having a first angle of incidence, a second incident beam 20 having a second angle of incidence, and a third incident beam 30 having a third angle of incidence, the diffraction efficiency of the second incident beam 20 may be the highest. In this case, when the second optical element 520 and the third optical element 530 are each irradiated with the first incident beam 10, the second incident beam 20 and the third incident beam 30, the diffraction efficiency of the second incident beam 20 will be also the highest.

FIG. 4B is a view showing the maximum diffraction efficiency angles in a plurality of optical elements including interference patterns having different inclination angles.

Referring to FIG. 4B, when interference patterns 404, 405 and 406 formed respectively on a fourth optical element 540, a fifth optical element 550, and a sixth optical element 560 for producing the holographic optical element 1 have the same pitch but have different inclination angles, the fourth optical element 540, the fifth optical element 550, and the sixth optical element 560 have different maximum diffraction efficiency angles.

Specifically, when the fourth optical element 540 is irradiated with the first incident beam 10, the second incident beam 20 and the third incident beam 30, the diffraction efficiency of the first incident beam 10 may be the highest. In addition, when the fifth optical element 550 on which the interference pattern 405 having an inclination angle greater than the interference pattern 404 of the fourth optical element 540 is recorded is irradiated with the first incident beam 10, the second incident beam 20 and the third incident beam 30, the diffraction efficiency of the second incident beam 20 may be the highest.

In addition, when the sixth optical element 560 on which the interference pattern 406 having an inclination angle greater than the interference pattern 405 of the fifth optical element 550 is recorded is irradiated with the first incident beam 10, the second incident beam 20 and the third incident beam 30, the diffraction efficiency of the third incident beam 30 may be the highest.

The holographic optical element 1 produced by combining the plurality of optical elements 540, 550 and 560 so as to have different maximum diffraction efficiency angles depending on positions thereof may be applied to a vehicle head-up display (HUD), etc.

FIG. 5A is a view showing an augmented image light emitted to the user's eye box by a conventional holographic optical element obtained by combining the plurality of optical elements shown in FIG. 4A.

For example, referring to FIG. 5A, an emission-side optical element 500-2 in FIG. 5A is an element formed by combining the first optical element 510, the second optical element 520 and the third optical element 530 on which the interference patterns 401, 402 and 403 having the same pitch and the same inclination angle are recorded, respectively.

When an incidence-side optical element 500-1 is irradiated with the first incident beam 10, the second incident beam 20 and the third incident beam 30, the beam lights may reach the emission-side optical element 500-2 by total reflection. When the diffraction efficiency of the second incident beam 20 is the highest among the diffraction efficiencies of the lights that reached the first optical element 510 of the emission-side optical element 500-2, the diffraction efficiency of the second incident beam 20 is also the highest among the diffraction efficiencies of the lights that reached the second optical element 520 and the third optical element 530.

Therefore, among the lights emitted from the emission-side optical element 500-2, most of the light having the maximum diffraction efficiency is emitted to areas other than the user's eye box area. In addition, among lights containing information on an augmented image and flowing into the user's eye box, only the second incident beam 20 containing information on a specific part of the augmented image is diffracted with maximum diffraction efficiency and emitted to the user's eye box.

FIG. 5B is a view showing an augmented image light emitted to the user's eye box by the holographic optical element according to one embodiment of the present disclosure, obtained by combining the plurality of optical elements shown in FIG. 4B.

Referring to FIG. 5B, an emission-side optical element 500-4 in FIG. 5B is an element formed by combining the fourth optical element 540, the fifth optical element 550 and the sixth optical element 560 on which the interference patterns 404, 405 and 406 having the same pitch but having different inclination angles are recorded, respectively.

When an incidence-side optical element 500-3 is irradiated with the first incident beam 10, the second incident beam 20 and the third incident beam 30, the beam lights may reach the emission-side optical element 500-4 by total reflection. In this case, the diffraction efficiency of the first incident beam 10 may be the highest among those of the lights that reached the fourth optical element 540.

In addition, among the lights that reached the fifth optical element 550 on which the interference pattern 405 having a greater inclination angle than the interference pattern 404 of the fourth optical element 540 is recorded, the second incident beam 20 may have the highest diffraction efficiency, and among the lights that reached the sixth optical element 560 on which the interference pattern 406 having a greater inclination angle than the interference pattern 405 of the fifth optical element 550 is recorded, the third incident beam 30 may have the highest diffraction efficiency.

Therefore, among the lights emitted from the emission-side optical element 500-4, most of the light having the maximum diffraction efficiency is emitted to the user's eye box area. In addition, among the lights containing augmented image information and flowing into the user's eye box, the first incident beam 10, the second incident beam 20 and the third incident beam 30, which contain information on each part of the augmented image, are diffracted uniformly with maximum diffraction efficiency and emitted to the user's eye box area.

FIG. 6A is a view showing an example of the augmented image according to FIG. 5A, which is visible to the user.

Referring to FIG. 6A, when only the second incident beam 20 is diffracted with maximum diffraction efficiency and emitted to the user's eye box as shown in FIG. 5A, the augmented image viewed by the user has high brightness only at a specific part thereof.

FIG. 6B is a view showing an example of the augmented image according to FIG. 5B, which is visible to the user.

Referring to FIG. 6B, when the first incident beam 10, the second incident beam 20 and the third incident beam 30 are diffracted with maximum diffraction efficiency and uniformly emitted to the user's eye box as shown in FIG. 5B, the augmented image viewed by the user generally has a higher brightness than that in FIG. 6A and has uniform and high brightness throughout thereof.

Hereinafter, the holographic optical element 1 according to one embodiment of the present disclosure will be described.

FIG. 7 is a view showing the holographic optical element according to one embodiment of the present disclosure.

Referring to FIG. 7, the holographic optical element 1 according to one embodiment of the present disclosure is constructed by combining the plurality of optical elements 540, 550 and 560, and the interference patterns 404, 405 and 406 recorded on the optical elements 540, 550 and 560, respectively, may have the same pitch, but have different inclination angles.

In addition, the plurality of optical elements 540, 550 and 560 may be combined together so that the inclination angles of the interference pattern 404, 405 and 406 gradually increase or decrease in a predetermined direction.

Specifically, as the plurality of optical elements constituting the holographic optical element 1 are combined together so that the inclination angles of the interference patterns recorded on the optical elements gradually increase or decrease, the optical elements have different angles at which the efficiency of diffraction of light by the optical elements reaches a maximum, and thus most of light having maximum diffraction efficiency among emitted lights is emitted to the user's eye box area, thus enhancing the brightness of the augmented image.

On the other hand, when the optical elements are combined together so that the inclination angles of the interference patterns recorded on the optical elements do not have a tendency to gradually increase or decrease, light having maximum diffraction efficiency among emitted lights cannot be emitted to the user's eye box area, and thus the brightness of the augmented image is lowered.

Meanwhile, although the holographic optical element 1 according to one embodiment of the present disclosure may be produced by the method for producing the holographic optical element 1 according to the above-described embodiment of the present disclosure, it may also be produced by another method.

Hereinafter, the operations and effects of the holographic optical element 1 of the present disclosure and a production method therefor will be described in detail.

First, the master 200, which is a diffractive optical element, is laminated on the substrate 100, and the photosensitive material 300 is laminated on the master 200. Then, the interference pattern 404, 405 or 406 is recorded on the photosensitive material 300 by irradiating the photosensitive material 300 with an incident beam. Then, an optical element 540, 550 or 560 is produced by separating the photosensitive material 300, on which the interference pattern 404, 405 or 406 is recorded, from the master 200.

In addition, the above-described process is repeated by laminating another photosensitive material 300 on the master 200, rotating the master 200, irradiating the photosensitive material with an incident beam at a different angle of incidence, and producing the optical element 540, 550 or 560 by separating the photosensitive material 300, on which the interference pattern 404, 405 or 406 is recorded, from the master 200.

The interference patterns 404, 405 and 406 recorded on the plurality of optical elements 540, 550 and 560 produced have the same pitch and different inclination angles. The holographic optical element 1 is produced by combining the plurality of optical elements 540, 550 and 560.

In this case, the plurality of optical elements 540, 550 and 560 are combined together so that the inclination angles of the interference patterns 404, 405 and 406 recorded on the holographic optical element 1 gradually increase or decrease in a predetermined direction.

When the holographic optical element 1 produced in this way is applied to a vehicle head-up display (HUD), etc., light containing information on each part of an augmented image will be diffracted uniformly with maximum diffraction efficiency and focused and emitted to the user's eye box area by the holographic optical element 1, because the holographic optical element 1 has different maximum diffraction efficiency angles of light depending on positions thereof.

As the holographic optical element according to the present disclosure is formed by combining the plurality of optical elements on which the interference patterns having the same pitch and different inclination angles are recorded, it focuses and emits augmented image light having high brightness to the user's eye box area, and thus provides the effect of enabling the user to see the augmented image having high brightness.

In addition, since the holographic optical element enables light containing information on each part of the augmented image and having high brightness to be focused on and uniformly emitted to the user's eye box area, it provides the effect of enabling the user to see the augmented image having uniform brightness.

In addition, the method for producing a holographic optical element according to the present disclosure provides the effect of enabling the holographic optical element to be produced by a simple and convenient process, because it produces a plurality of optical elements to be combined, on which interference patterns having the same pitch and different inclination angles are recorded, through simple replication by rotating the master.

Hereinafter, an apparatus for producing a holographic optical element according to one embodiment of the present disclosure will be described.

Still another embodiment of the present disclosure provides an apparatus for producing a holographic optical element, the apparatus including: a lamination unit configured to form a laminate by laminating a substrate, a master, which is a diffractive optical element having an interference pattern formed thereon, and a photosensitive material in a predetermined order; a beam irradiation unit configured to irradiate the photosensitive material with an incident beam at a predetermined angle of incidence so that the interference pattern of the master is recorded on the photosensitive material; a rotation control unit configured to rotate at least one of the laminate and the beam irradiation unit so that the angle of incidence of the incident beam incident to the photosensitive material is controlled; a master removal unit configured to produce an optical element by separating the photosensitive material, on which the interference pattern is recorded, from the master; and a combining unit configured to combine a plurality of the optical elements to form a holographic optical element.

The apparatus for producing a holographic optical element according to one embodiment of the present disclosure provides the effect of enabling the holographic optical element to be produced in large amounts in a simple and convenient manner, because it produces the plurality of optical elements to be combined, on which interference patterns having the same pitch and different inclination angles are recorded, through simple replication by rotating the master.

According to one embodiment of the present disclosure, the apparatus includes a lamination unit configured to form a laminate by laminating a substrate, a master, which is a diffractive optical element having an interference pattern formed thereon, and a photosensitive material in a predetermined order. Specifically, the laminate may be formed by laminating the master, which is a diffractive optical element having an interference pattern formed thereon, on the substrate, and laminating the photosensitive material on a surface opposite to the substrate contacting surface of the master. More specifically, the laminate may be formed by laminating the substrate, the master and the photosensitive material in this order. Since the substrate is rotated as much as the laminate is rotated, the laminate may be rotated to control the angle of incidence of the incident beam as will be described later. Furthermore, as the photosensitive material is irradiated with the incident beam as described later, an interference pattern may be recorded on the photosensitive material by interference between the light passing through the photosensitive material and the light diffracted by the master. As the apparatus includes the lamination unit configured to form the laminate by laminating the substrate, the master, which is a diffractive optical element having an interference pattern formed thereon, and the photosensitive material in a predetermined order as described above, the apparatus may easily form the laminate. In addition, as the substrate is rotated, the angle of incidence of the incident beam may be controlled by rotating the entire laminate, and the interference pattern of the master may be transferred to and recorded on the photosensitive material.

According to one embodiment of the present disclosure, the apparatus includes a beam irradiation unit configured to irradiate the photosensitive material with an incident beam at a predetermined angle of incidence so that the interference pattern of the master is recorded on the photosensitive material. Specifically, the beam irradiation unit is a means for outputting an incident beam, and enables the incident beam to form a predetermined angle of incidence of an incident beam incident to the photosensitive material, so that an interference pattern generated by interference between the light diffracted by the master and the light passing through the photosensitive material after irradiation of the incident beam may be recorded on the photosensitive material. The beam irradiation unit may be used without limitation as long as it corresponds to a light irradiation device that is used in the field of producing a holographic optical element. As described above, as the apparatus includes the beam irradiation unit configured to irradiate the photosensitive material with an incident beam at a predetermined angle of incidence so that the interference pattern of the master is recorded on the photosensitive material, the beam irradiation unit may easily control the inclination angle of the incident beam by interworking with the rotation control unit as described below, and it is possible to easily control the angle of incidence of the recorded interference pattern.

According to one embodiment of the present disclosure, the apparatus includes a rotation control unit configured to rotate at least one of the laminate and the beam irradiation unit so that the angle of incidence of the incident beam incident to the photosensitive material is controlled. Specifically, the rotation control unit rotates the laminate, or rotates the beam irradiation unit, or rotates both the laminate and the beam irradiation unit, thereby controlling the angle of incidence of the incident beam incident to the photosensitive material. As the angle of incidence is controlled, the path of the light passing through the photosensitive material and the path of the light diffracted by the master are changed, so that the inclination angle of the interference pattern may be controlled while the pitch of the interference pattern recorded on the photosensitive material is not changed. As the apparatus includes the rotation control unit that rotates at least one of the laminate and the beam irradiation unit so that the angle of incidence of the incident beam incident to the photosensitive material is controlled as described above, it is possible to change the inclination angle of the interference pattern while not changing the pitch of the interference pattern recorded on the photosensitive material.

According to one embodiment of the present disclosure, the apparatus includes a master removal unit configured to produce an optical element by separating the photosensitive material, on which the interference pattern is recorded, from the master. Specifically, the master removal unit may produce an optical element by separating the master or the structure including the master laminated on the substrate from the photosensitive material after the interference pattern is recorded on the photosensitive material.

As the apparatus includes the master removal unit that produces an optical element by separating the photosensitive material, on which the interference pattern is recorded, from the master, the apparatus may produce the optical element, and prevent the path of light from being changed by the master in the reproduction process.

According to one embodiment of the present disclosure, the laminate is formed by the lamination unit, and then the beam irradiation unit or the laminate is rotated by the rotation control unit depending on the inclination angle of the interference pattern to be recorded, thereby controlling the angle of incidence of the incident beam, and the interference pattern is recorded, and then the master is removed by the master removal unit, thereby producing an optical element. The above-described process is repeated, thereby producing a plurality of optical elements in which the interference patterns have the same pitch, but have different inclination angles. As the plurality of optical elements are produced as described above, it is possible to realize the holographic optical element in which the inclination angles of the interference patterns tend to change in a predetermined direction.

According to one embodiment of the present disclosure, the apparatus includes a combining unit configured to combine the plurality of optical elements to form the holographic optical element. Specifically, the combining unit may arrange and combine the plurality of optical elements produced as described above. As the apparatus includes the combining unit configured to combine the plurality of the optical elements to form the holographic optical element as described above, the apparatus may realize the holographic optical element in which the inclination angles of the interference patterns recorded thereon tend to change in a predetermined direction.

According to one embodiment of the present disclosure, the rotation control unit may rotate at least one of the laminate and the beam irradiation unit in order to irradiate the photosensitive material with the incident beam at a different angle of incidence so that the interference patterns recorded on the optical elements, respectively, have the same pitch and different inclination angles. Specifically, the rotation control unit rotates the laminate, or rotates the beam irradiation unit, or rotates both the laminate and the beam irradiation unit, thereby controlling the angle of incidence of the incident beam incident to the photosensitive material. As the angle of incidence is controlled, the path of the light passing through the photosensitive material and the path of the light diffracted by the master are changed, so that the inclination angle of the interference pattern may be controlled while the pitch of the interference pattern recorded on the photosensitive material is not changed. The rotation control unit rotates at least one of the laminate and the beam irradiation unit in order to irradiate the photosensitive material with the incident beam at a different angle of incidence so that the interference patterns recorded on the optical elements, respectively, have the same pitch and different inclination angles. Thus, it is possible to produce optical elements having different inclination angles of various patterns.

According to one embodiment of the present disclosure, the combining unit may combine the plurality of optical elements together so that the inclination angles of the interference patterns recorded on the holographic optical element gradually increase or decrease in a predetermined direction. As the combining unit may combine the plurality of optical elements together so that the inclination angles of the interference patterns recorded on the holographic optical element gradually increase or decrease in a predetermined direction as described above, the combining unit may focus and emit augmented image light with high brightness to the user's eye box area, thereby providing the effect of enabling the user to see the augmented image having high brightness.

As described above, as the holographic optical element according to the present disclosure is formed by combining the plurality of optical elements on which the interference patterns having the same pitch and different inclination angles are recorded, it focuses and emits augmented image light having high brightness to the user's eye box area, and thus provides the effect of enabling the user to see the augmented image having high brightness.

In addition, since the holographic optical element enables light containing information on each part of the augmented image and having high brightness to be focused on and uniformly emitted to the user's eye box area, it provides the effect of enabling the user to see the augmented image having uniform brightness.

In addition, the method for producing a holographic optical element according to the present disclosure provides the effect of enabling the holographic optical element to be produced by a simple and convenient process, because it produces a plurality of optical elements to be combined, on which interference patterns having the same pitch and different inclination angles are recorded, through simple replication by rotating the master.

In addition, the apparatus for producing a holographic optical element according to the present disclosure provides the effect of enabling the holographic optical element to be produced in large amounts in a simple and convenient manner, because it produces the plurality of optical elements to be combined, on which interference patterns having the same pitch and different inclination angles are recorded, through simple replication by rotating the master.

Although the present disclosure has been described above in detail with reference to representative embodiments above, those of ordinary skill in the art to which the present disclosure pertains will appreciate that various modifications of the above-described embodiments are possible without departing from the scope of the present disclosure. Therefore, the scope of the present disclosure should not be limited to the described embodiments, and should be defined by all changes or modifications derived from the appended claims and equivalents to the claims.

What is claimed is:

1. A method for producing a holographic optical element comprising:
   (1) laminating a master on a substrate, wherein the master is a diffractive optical element having an interference pattern formed thereon;
   (2) laminating a photosensitive material on the master, and recording the interference pattern of the master on the photosensitive material by irradiating the photosensitive material with an incident beam at a predetermined angle of incidence;
   (3) producing an optical element by separating the photosensitive material having the interference pattern recorded thereon from the master;
   (4) producing a plurality of optical elements by repeating (2) and (3) a predetermined number of times, wherein when repeating each (2), the photosensitive material is irradiated with the incident beam at a different angle of incidence so that the interference patterns recorded on the plurality of optical elements, respectively, have the a pitch equal to a pitch of the interference pattern formed on the master and different inclination angles; and
   (5) forming the holographic optical element by combining the plurality of optical elements together.

2. The method of claim 1, wherein the (4) comprises irradiating the photosensitive material with the incident beam after rotating the substrate by a predetermined angle in each (2).

3. The method of claim 2, wherein the (5) comprises combining the plurality of optical elements together so that the different inclination angles of the interference patterns recorded on the holographic optical element gradually increase or decrease in a predetermined direction.

4. The method of claim 3, wherein
   the master diffracts the incident beam to the photosensitive material when the predetermined angle of incidence of the incident beam is between a first angle and a second angle, and
   the photosensitive material is irradiated with the incident beam after the substrate is rotated so that the predetermined angle of incidence of the incident beam incident to the master is between the first angle and the second angle.

5. The method of claim 4, wherein the master is composed of a holographic optical element or a diffractive optical element having a surface relief grating formed thereon.

6. The method of claim 4, wherein the photosensitive material is a photopolymer.

7. A holographic optical element comprising a plurality of optical elements, each of the plurality of optical elements produced by the method of claim 1, the interference patterns recorded on the plurality of optical elements having a pitch equal to the pitch of the interference pattern formed on the master and different inclination angles.

8. The holographic optical element of claim 7, wherein the plurality of optical elements are combined together so that the different inclination angles of the interference patterns gradually increase or decrease in a predetermined direction.

9. An apparatus for producing a holographic optical element comprising:
   a lamination unit configured to form a laminate, wherein the laminate includes a substrate, a master, and a photosensitive material formed in a predetermined order, wherein the master is a diffractive optical element having an interference pattern formed thereon;
   a beam irradiation unit configured to irradiate the photosensitive material with an incident beam at a predetermined angle of incidence so that the interference pattern of the master is recorded on the photosensitive material;
   a rotation control unit configured to rotate at least one of the laminate and the beam irradiation unit so that the predetermined angle of incidence of the incident beam incident to the photosensitive material is controlled;
   a master removal unit configured to produce an optical element and configurated to separate the photosensitive material having the interference pattern recorded thereon from the master; and
   a combining unit configured to combine a plurality of the optical elements together to form the holographic optical element.

10. The apparatus of claim 9, wherein the rotation control unit rotates the laminate and the beam irradiation unit in order to irradiate the photosensitive material with the incident beam at a different angle of incidence so that the interference patterns recorded on the plurality of optical elements, respectively, have the a pitch equal to a pitch of the interference pattern formed on the master and different inclination angles.

11. The apparatus of claim 9, wherein the combining unit is configured to combine different plurality of optical elements together so that the inclination angles of the interference patterns recorded on the holographic optical element gradually increase or decrease in a predetermined direction.

\* \* \* \* \*